United States Patent [19]

Leistner et al.

[11] Patent Number: 4,517,093
[45] Date of Patent: May 14, 1985

[54] PROCESS FOR THE BIOLOGICAL PURIFICATION OF WASTE WATER

[75] Inventors: Gerhard Leistner, Schmitten; Gerhard Müller, Kelkheim; Günther Sell, Hattersheim am Main; Alexander Bauer, Kelkheim, all of Fed. Rep. of Germany

[73] Assignee: Hoechst Aktiengesellschaft, Frankfurt am Main, Fed. Rep. of Germany

[21] Appl. No.: 655,295

[22] Filed: Sep. 26, 1984

Related U.S. Application Data

[63] Continuation of Ser. No. 572,608, Jan. 20, 1984, abandoned, which is a continuation of Ser. No. 130,070, Mar. 13, 1980, abandoned, which is a continuation of Ser. No. 10,535, Feb. 8, 1979, abandoned.

[30] Foreign Application Priority Data

Feb. 11, 1978 [DE] Fed. Rep. of Germany ....... 2805793

[51] Int. Cl.³ .............................................. C02F 3/12
[52] U.S. Cl. ................................................. 210/629
[58] Field of Search ............... 210/697, 197, 205, 207, 210/620–623, 629

[56] References Cited

U.S. PATENT DOCUMENTS

| 3,807,563 | 4/1974 | Reid | 210/205 X |
| 3,855,120 | 12/1974 | Garbo | 210/629 X |
| 4,043,771 | 8/1977 | Anand | 210/629 X |
| 4,100,071 | 7/1978 | Beurer et al. | 210/197 |
| 4,192,740 | 3/1980 | Savard et al. | 210/629 X |

Primary Examiner—Thomas Wyse
Attorney, Agent, or Firm—Curtis, Morris & Safford

[57] ABSTRACT

In a process for the biological purification of waste water by mixing a sludge-water mixture and air in an activation chamber charged continuously with waste water, activated sludge and air and from which an equivalent quantity of sludge-water mixture is discharged, the sludge-water mixture is guided along with the air in the activation chamber so as to define at least one loop shape motion. In a further embodiment of the process that part of the sludge-water mixture that does not continue its loop shape course is submitted to a biological after-reaction, preferably occurring in the activation chamber, while avoiding backmixing with the mixture in loop shape motion.

7 Claims, 1 Drawing Figure

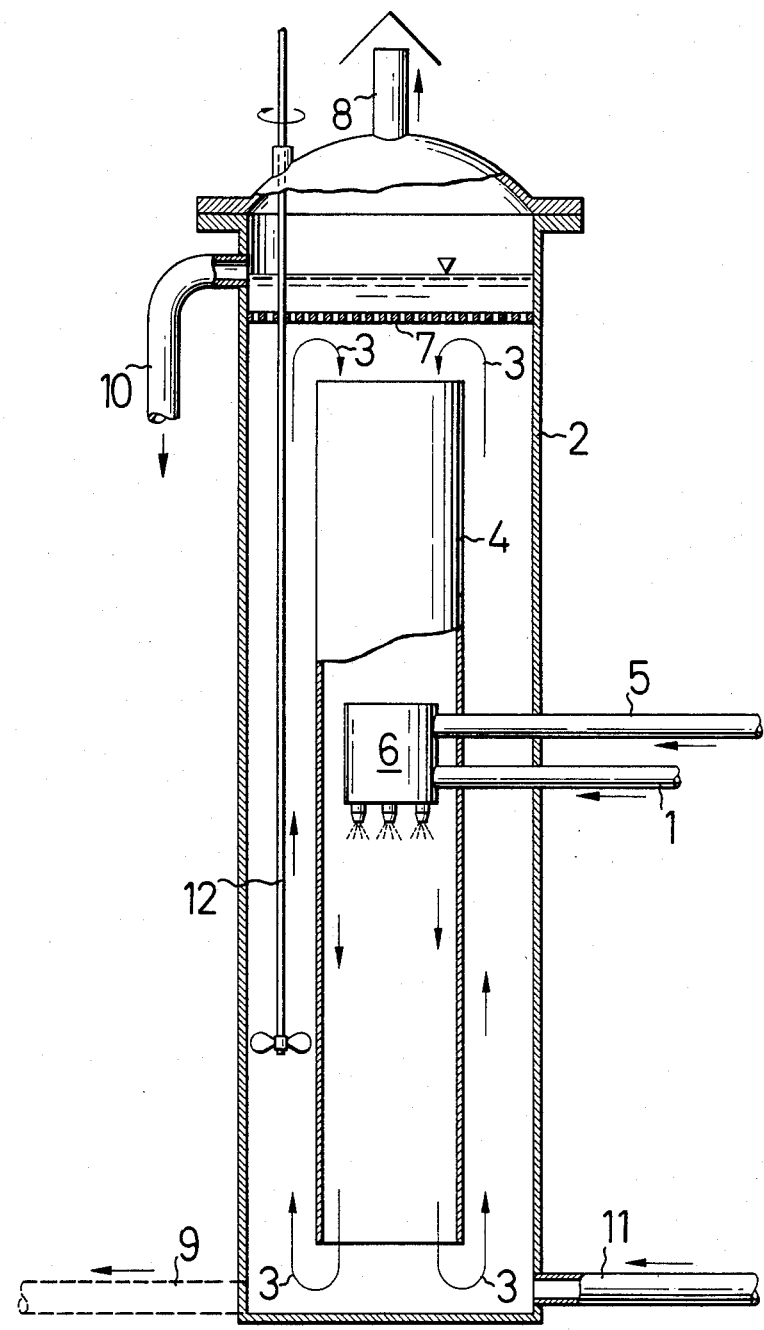

PROCESS FOR THE BIOLOGICAL PURIFICATION OF WASTE WATER

This application is a continuation of application Ser. No. 572,608, filed Jan. 20, 1984, abandoned, which is a continuation of Ser. No. 130,070, filed Mar. 13, 1980, now abandoned, which is a continuation of Ser. No. 010,535, filed Feb. 8, 1979, now abandoned.

The subject of the present invention is a process for the biological purification of waste water by mixing a sludge-water mixture and air in an activation chamber continuously charged with waste water, activated sludge and air and from which an equivalent quantity of sludge-water mixture is discharged.

In many processes there are produced waste waters polluted by organic matter. These waste waters may be purified by processes involving an elimination of the dissolved organic compounds by microorganisms in aerobic manner, as is generally known. Processes of this type are generally carried out in flat-bottomed activation basins and in settling basins. The known disadvantages of such a procedure include environmental hazards such as by bad odors owing to the great amounts of off-gases, a high noise level, a large space requirement and high capital and energy costs.

It is further known to purify waste waters in high cylindrical towers resembling a bubble column. At the upper edge of these towers there are mounted basins for clarifying the sludge-water mixtures requiring high capital costs. A further disadvantage resides in the fact that these towers have no inserts at all, as a consequence of which the space load is relatively low. Finally mixing takes place only in the lower portion, thus requiring a relatively high energy input.

It was an object of the invention to provide a process which makes it possible to purify waste water with low energy and capital costs, while avoiding the above-mentioned disadvantages.

The process for the biological purification of waste water by mixing a sludge-water mixture and air in an activation chamber 10 to 30 m in height, continuously charged with waste water, activated sludge, and air and from which an equivalent quantity of sludge-water mixture is discharged, comprises keeping the sludge-water mixture and the air in the activation chamber in at least one loop shape motion.

In principle the air may be introduced into the downwardly directed mixture flowing in a loop shape motion. In such a case the motion of the mixture is suitably maintained by additional mechanical energy working against the lifting forces of the gas bubbles. Furthermore it may be advantageous to submit that part of the sludge-water mixture that no longer continues its loop shaped flow path to a biological afterreaction. Depending on the cross-section of the activation chamber, the sludge-water mixture may be guided along with the air in 1 to 15 loops.

The invention will be illustrated by way of example in the accompanying FIGURE and in the description referring thereto.

The FIGURE is a vertical sectional view of a plant for performing the process of the invention.

Referring now to the FIGURE: The waste-water to be purified (crude water) is introduced into the reactor 2 containing the activation chamber through conduit 1. The sludge-water mixture and the air are guided in the activation chamber in at least one loop 3. Depending on the dimensions of the reactor 2 up to 15 loops are possible, which may be achieved by a corresponding number of baffle plates 4. The air is introduced through conduit 5 and distribution element 6. It may be introduced into the ascending part of the loop or into the descending part contrary to the lifting forces of the gas. In principle the air may be introduced into the sludge-water mixture at any dedired position. When introducing the air into the descending part of the loop, the mixture is suitably kept in motion contrary to the lifting forces of the gas bubbles by additional mechanical energy, for example by a stirrer 12 or by means of a sludge-water circuit moved by a pump (not shown). In that case the mixture is preferably withdrawn in the bottom part of the reactor and re-introduced into the reactor near the air inlet. It may be advantageous to submit the sludge-water mixture to an afterreaction prior to leaving the activation chamber. For this purpose the reactor 2 may be provided with inserts 7, which may be a perforated plate or the like in order to avoid backmixing with the mixture in loop shape motion. The off-gas leaves the activation chamber via conduit 8. The sludge-water mixture may be discharged either in the bottom part of the reactor 2 via conduit 9 (illustrated by dotted lines) or near the level of the liquid via conduit 10. When discharging the mixture via conduit 10 it may be guided to degassing and clarifying operations by sedimentation (not shown). When discharging the mixture via conduit 9, the activated sludge settles in particularly advantagous manner by flotation since the mixture contains the required gas (not shown). Activated sludge is introduced through conduit 11.

By air there is to be understood atmospheric air, air enriched with oxygen and pure oxygen.

EXAMPLE

There is used a reactor 20 m is height and 5 m in diameter. In its activation chamber there is arranged a guide tube 16 m in height and 2.8 m in diameter. The level of the sludge-water mixture is 18 m. The air and the waste water (crude water) are introduced into the descending part of the sludge-water mixture kept in loop shape motion at a level 9 meters below the liquid level. Activated sludge is introduced in the lower portion. The sludge-water mixture is discharged from the reactor at a level near the liquid level. There are introduced into the reactor 60 m$^3$/h of waste water having a BOD$_5$ value of 1200 mg/l and 510 Nm3/h of air. In the lower portion of the reactor there are introduced 60 m$^3$/h of activated sludge. The temperature in the reactor is 20° C.

The water leaving the reactor has a BOD$_5$ value from 30 to 50 mg/l.

What is claimed is:

1. A process for biological purification of waste water, which process comprises
   continuous charging an oxygen-containing gas, waste water, and activated sludge to a first reaction zone of an activation chamber 10 to 30 meters in height;
   mixing said gas, said waste water, and said activated sludge within said first reaction zone to form a mixture of said gas, said water, and said sludge;
   guiding a portion of said mixture of sludge, water, and gas in a loop-shaped flow within said first reaction zone;
   feeding the remaining portion of said mixture of sludge, water, and gas, not guided in a loop-shaped flow, upwardly from the top of the first reaction zone to a second reaction zone within said activation chamber and disposed directly atop said first reaction zone;

preventing said mixture in said second reaction zone from any substantial backmixing into said first reaction zone; and degassing said mixture in said second reaction zone to remove dissolved gasses therefrom, while biological reaction continues in the second reaction zone.

2. The process of claim 1 wherein the charging of said gas includes charging the gas into the sludge-water mixture as said mixture is moving upwardly through the first reaction zone of the activation chamber.

3. The process of claim 2, wherein the sludge, water, and gas mixture is guided in two to fifteen separate loop-shaped flow paths within the first reaction zone.

4. The process of claim 14, wherein said charging includes charging said gas into the sludge-water mixture as the mixture is moving downwardly through the first reaction zone, and further comprising supplying mechanical energy to said activation chamber to maintain the loop-shaped flow of the mixture through the first reaction zone.

5. The process of claim 4, wherein the sludge, water, and gas mixture is guided in two to fifteen separate loop-shaped flow paths within the first reaction zone.

6. The process of claim 1, wherein the sludge, water, and gas mixture is guided in two to fifteen separate loop-shaped flow paths within the first reaction zone.

7. The process of claim 1, wherein a perforated plate separates the first reaction zone from the second reaction zone, and the step of feeding the remaining portion of the mixture includes flowing the mixture upwards through perforations in said plate.

* * * * *